United States Patent
Watanabe et al.

(10) Patent No.: US 7,742,742 B2
(45) Date of Patent: Jun. 22, 2010

(54) COMMUNICATION DEVICE AND METHOD FOR SETTING COMMUNICATION PARAMETERS

(75) Inventors: Mitsuhiro Watanabe, Ebina (JP); Kenichi Fujii, Katsushika-ku (JP); Kazuo Moritomo, Kawasaki (JP); Tatsuhiko Sakai, Nakano-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 602 days.

(21) Appl. No.: 11/408,371

(22) Filed: Apr. 21, 2006

(65) Prior Publication Data
US 2006/0246941 A1    Nov. 2, 2006

(30) Foreign Application Priority Data
Apr. 27, 2005    (JP) .............................. 2005-130477

(51) Int. Cl.
*H04B 7/00* (2006.01)
*H04W 36/00* (2009.01)
*H04W 4/00* (2006.01)
*H04W 40/00* (2006.01)

(52) U.S. Cl. ...................... 455/41.2; 455/436; 455/437; 455/439; 455/448; 370/338; 370/328

(58) Field of Classification Search ................ 455/41.2, 455/41.3, 452.1, 452.2, 509, 552.1, 436, 455/437, 439, 448; 370/328, 338
See application file for complete search history.

(56) References Cited

U.S. PATENT DOCUMENTS

| | | | |
|---|---|---|---|
| 6,985,740 B2 * | 1/2006 | Shyy et al. | 455/453 |
| 2003/0100335 A1 | 5/2003 | Gassho et al. | |
| 2004/0162027 A1 * | 8/2004 | Chang | 455/41.2 |
| 2004/0198366 A1 * | 10/2004 | Crocker et al. | 455/452.1 |
| 2006/0148516 A1 * | 7/2006 | Reddy et al. | 455/552.1 |

FOREIGN PATENT DOCUMENTS

JP    2003-163668 A    6/2003

* cited by examiner

*Primary Examiner*—Un C Cho
(74) *Attorney, Agent, or Firm*—Canon U.S.A., Inc. I.P. Division (57) ABSTRACT

A communication device is provided having wireless capabilities configured to communicate in a first communication mode via an access point and in a second communication mode directly between other communication devices without utilizing an access point. The communication device includes a detecting unit configured to detect the existence of an available wireless network; a receiving unit configured to receive a request from another communication device for transferring communication parameters in the second communication mode; and a transmitting unit configured to transmit communication parameters relating to the available wireless network to the other communication device in response to the request.

5 Claims, 9 Drawing Sheets

COMMUNICATION DEVICE AND METHOD FOR SETTING COMMUNICATION PARAMETERS

BACKGROUND OF THE INVENTION

1. Field of the Invention

The present invention relates to a method for setting communication parameters of networks among communication devices.

2. Description of the Related Art

Recently, devices that are treated as peripheral devices of a computer, such as a digital camera, a printer, a storage, a scanner, a data input unit, and a data output unit, have been capable of directly communicating with each other via cables without computer intervention. Furthermore, demand for performing wireless communication instead of wired communication has increased, and wireless communication among the aforementioned peripheral devices has come into use.

A method for setting parameters for wireless communication in individual devices is disclosed in U.S. Patent Application Ser. No. 20030100335-A1 (Japanese Patent Laid-Open No. 2003-163668). In this publication, one device holds two types of communication parameter information. The one device transfers second wireless communication parameters (parameters for infrastructure communication) directly to another device by wireless communication (ad hoc communication) using a wireless network that is configured with first wireless communication parameters (parameters for ad hoc communication). Then, the second wireless communication parameters are set in the other device, and both devices connect to the same wireless network with the second wireless communication parameters.

However, in the foregoing known method, the one device does not necessarily transfer wireless communication parameters that are suitable for the environment to the other device. Thus, the one device may transfer to the other device wireless communication parameters with which actual communication cannot be performed, and the other device may be incapable of connecting to any network.

Moreover, a problem exists, in that the other device can connect only to a specific network that can be accessed with the second wireless communication parameters even in an environment in which a plurality of wireless networks are available.

SUMMARY OF THE INVENTION

The present invention is provided to readily set available communication parameters in a communication device that is added to a network. Furthermore, the present invention is provided to set communication parameters that are suitable for the environment in which a communication device exists.

According to a first exemplary embodiment of the present invention, a communication device is provided having wireless capabilities configured to communicate in a first communication mode via an access point and in a second communication mode directly between other communication devices without utilizing an access point. The communication device includes a detecting unit configured to detect the existence of an available wireless network; a receiving unit configured to receive a request from another communication device for transferring communication parameters in the second communication mode; and a transmitting unit configured to transmit communication parameters relating to the available wireless network to the other communication device in response to the request.

According to an aspect of the aforementioned embodiment, the transmitting unit is capable of transmitting communication parameters pertaining to the first and second communication modes. According to another aspect of the present invention, the communication device may further include a storage unit that stores individual communication parameters of the first and second communication modes, wherein the transmitting unit is configured to transmit the communication parameters stored in the storage unit. And according to another aspect of the instant embodiment, the transmitting unit may be configured to transmit communication parameters of a network specified by the other communication device.

According to another exemplary embodiment of the present invention, a communication device is provided having wireless capabilities configured to communicate in a first communication mode via an access point and a second communication mode directly between other communication devices without utilizing an access point. The communication device includes a requesting unit configured to request another communication device to transfer communication parameters in the second communication mode; a setting unit configured to receive and set communication parameters sent in response to the request; a determining unit configured to determine whether communication can be performed with the set communication parameters; and a re-requesting unit configured to re-request the other communication device to transfer other communication parameters in accordance with the determination by said determining unit.

According to another exemplary embodiment of the present invention, a communication device is provided having wireless capabilities configured to communicate in a first communication mode via an access point and a second communication mode directly between other communication devices without utilizing an access point. The communication device includes a detecting unit configured to detect the existence of an available wireless network; and a requesting unit configured to request another communication device to transfer communication parameters relating to the available wireless network in the second communication mode.

According to an aspect of the aforementioned embodiment, the communication device may further include a setting unit configured to set communication parameters sent in response to the request. Moreover, according to another aspect of the instant embodiment, the communication device may further include a determining unit configured to determine whether communication parameters of the first or second communication mode are received in response to the request; and a setting unit configured to set communication parameters received from the other communication device as the determined communication parameters.

According to still yet another exemplary embodiment of the present invention, a communication device is provided having wireless capabilities configured to communicate with other communication devices in a plurality of differing modes. Here, the communication device includes a detecting unit configured to detect the existence of an available wireless network; a receiving unit configured to receive a request from another communication device for transferring communication parameters in one of the plurality of modes; and a transmitting unit configured to transmit communication parameters relating to the available wireless network to the other communication device in response to the request.

Still further, according to another exemplary embodiment of the present invention, a communication device is provided having wireless capabilities configured to communicate with other communication devices in a plurality of differing modes. In this embodiment, the communication device includes a requesting unit configured to request another communication device to transfer communication parameters in one of the plurality of communication modes; a setting unit configured to receive and set communication parameters sent in response to the request; a determining unit configured to determine whether communication can be performed with the set communication parameters; and a re-requesting unit configured to re-request the other communication device to transfer other communication parameters in accordance with the determination by said determining unit.

Furthermore, according to another exemplary embodiment of the present invention, a communication device is provided having wireless capabilities configured to communicate with other communication devices in a plurality of differing modes. The communication device pertaining to this embodiment includes a detecting unit configured to detect for the existence of an available wireless network; and a requesting unit configured to request another communication device to transfer communication parameters relating to the available wireless network in one of the plurality of modes.

Additionally, according to another exemplary embodiment of the present invention, a method is provided for setting communication parameters of a communication device having wireless capabilities that is configured to communicate in a plurality of differing communication modes. In this case, the method includes detecting for the existence of an available wireless network; receiving a request from another communication device for transferring communication parameters in one of the plurality of communication modes; and transmitting communication parameters relating to the available wireless network to the other communication device in response to the request. And, according to yet another exemplary embodiment of the present invention, a method is provided for setting communication parameters of a communication device having wireless capabilities that is configured to communicate in a plurality of differing communication modes. Here, the method includes requesting another communication device to transfer communication parameters in one of the plurality of communication modes; receiving the communication parameters from the other communication device; setting the received communication parameters from the other communication device; determining whether communication can be performed with the set communication parameters; and re-requesting the other communication device to transfer other communication parameters in accordance with the determination communication can be performed with the set communication parameters.

Moreover, according to yet another exemplary embodiment of the present invention, a method is provide for setting communication parameters of a communication device having wireless capabilities that is configured to communicate in a plurality of differing communication modes. In this embodiment, the method includes detecting the existence of an available wireless network; and requesting another communication device to transfer communication parameters relating to the available wireless network in one of the plurality of communication modes.

Still further, according to another exemplary embodiment of the present invention, a program is provided that when executed by a computer that causes a communication device to set communication parameters, the communication device configured to communicate in one of a first and a second communication modes which differ from each other. The program includes instructions for detecting the existence of an available wireless network; instructions for determining a request from another communication device for transferring communication parameters, the request being received in the second communication mode; and instructions for transmitting communication parameters relating to the available wireless network to the other communication device when it is determined that the request has been received.

And in another exemplary embodiment of the present invention, a program is provided which may be executed by a computer that causes a communication device to set communication parameters, the communication device being capable of performing communication in one of a first and second communication mode which differ from each other. Here, the program includes instructions for requesting another communication device to transfer communication parameters in the second communication mode; instructions for receiving the communication parameters from the other communication device; instructions for setting the received communication parameters; instructions for determining whether communication can be performed with the set communication parameters; and instructions for re-requesting the other communication device to transfer other communication parameters in accordance with the determination whether communication can be performed with the set communication parameters.

And finally, according to another exemplary embodiment of the present invention, a program is provided which may be executed by a computer that causes a communication device to set communication parameters, the communication device being configured to communicate in one of a first and second communication mode which differ from each other. In this case, the program includes instructions for detecting the existence of an available wireless network; and instructions for requesting another communication device to transfer communication parameters relating to the available wireless network in the second communication mode.

DESCRIPTION OF THE EMBODIMENTS

Numerous exemplary embodiments, aspects and features of the present invention will now herein be described in detail with reference to the attached drawings. It is noted that the following exemplary embodiments are not intended to limit the invention defined by the accompanying claims.

First Exemplary Embodiment

Figure 1:
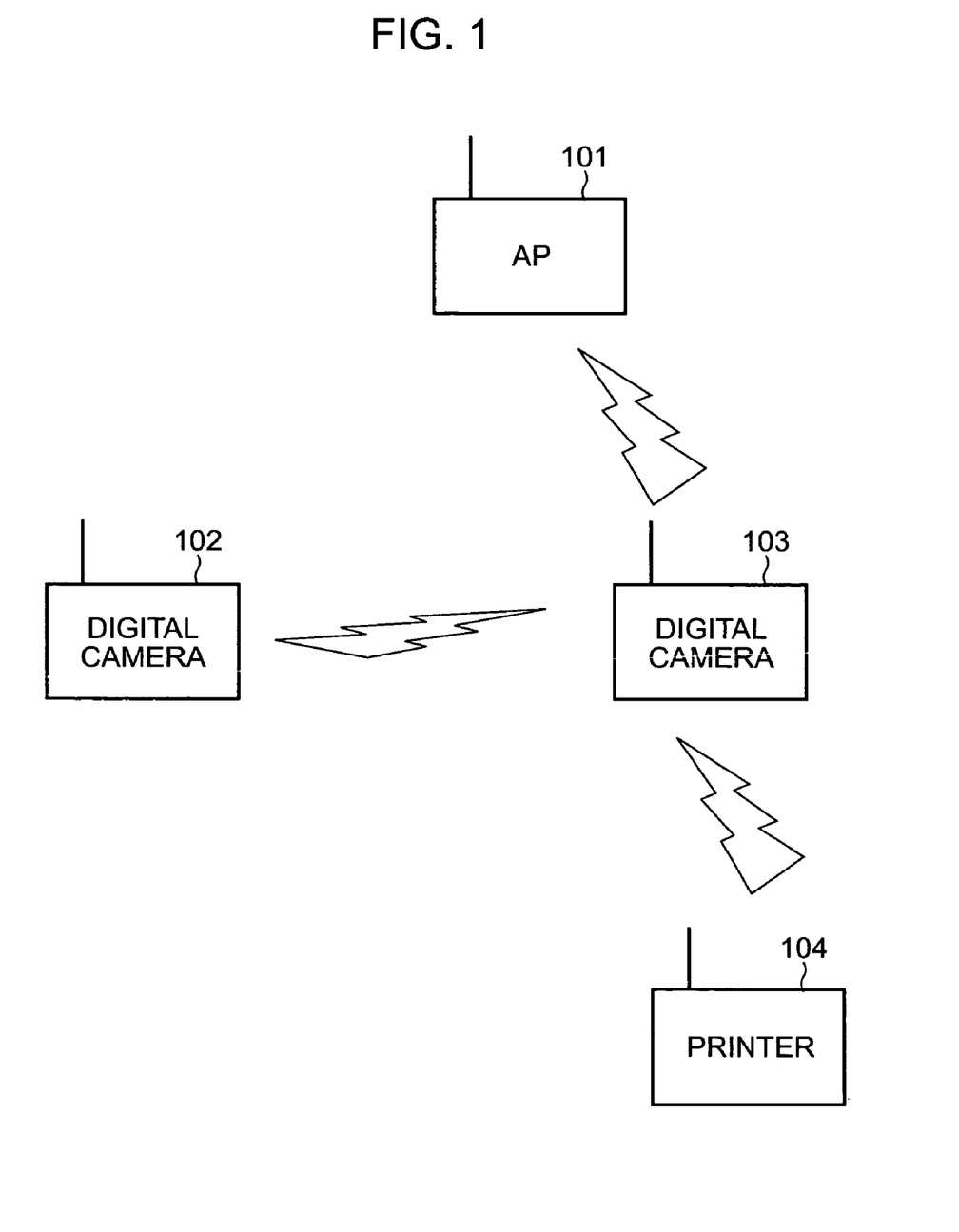
FIG. 1 shows the configuration of an exemplary wireless communication system according to exemplary embodiments of the present invention.

FIG. 1 shows the configuration of an exemplary wireless communication system according to the exemplary embodiments of the present invention based on standard communication techniques (such as those related to the Institute of Electrical and Electronics Engineers (IEEE) 802.11).

The wireless communication system includes an access point (AP) 101, digital cameras 102 and 103, and a printer 104. The digital camera 103 has a wireless communication function and stores a plurality of sets of parameters for infrastructure wireless communication and a plurality of sets of parameters for ad hoc wireless communication. The digital camera 103 recognizes that the digital camera 103 can connect to the AP 101 in the infrastructure mode and communicate with the printer 104 through the air in the ad hoc mode at the current position of the digital camera 103.

With regard to the aforementioned arrangement, a scenario will now be described, where the digital camera 102, which is newly added to the system, requests the digital camera 103 to transfer to the digital camera 102 wireless communication parameters with which the network can be accessed. The infrastructure mode is a communication mode in which terminals participate in a network formed by an access point and perform communication under the control of the access point, and the ad hoc mode is a communication mode in which terminals directly communicate with each other without an access point.

Figure 2:
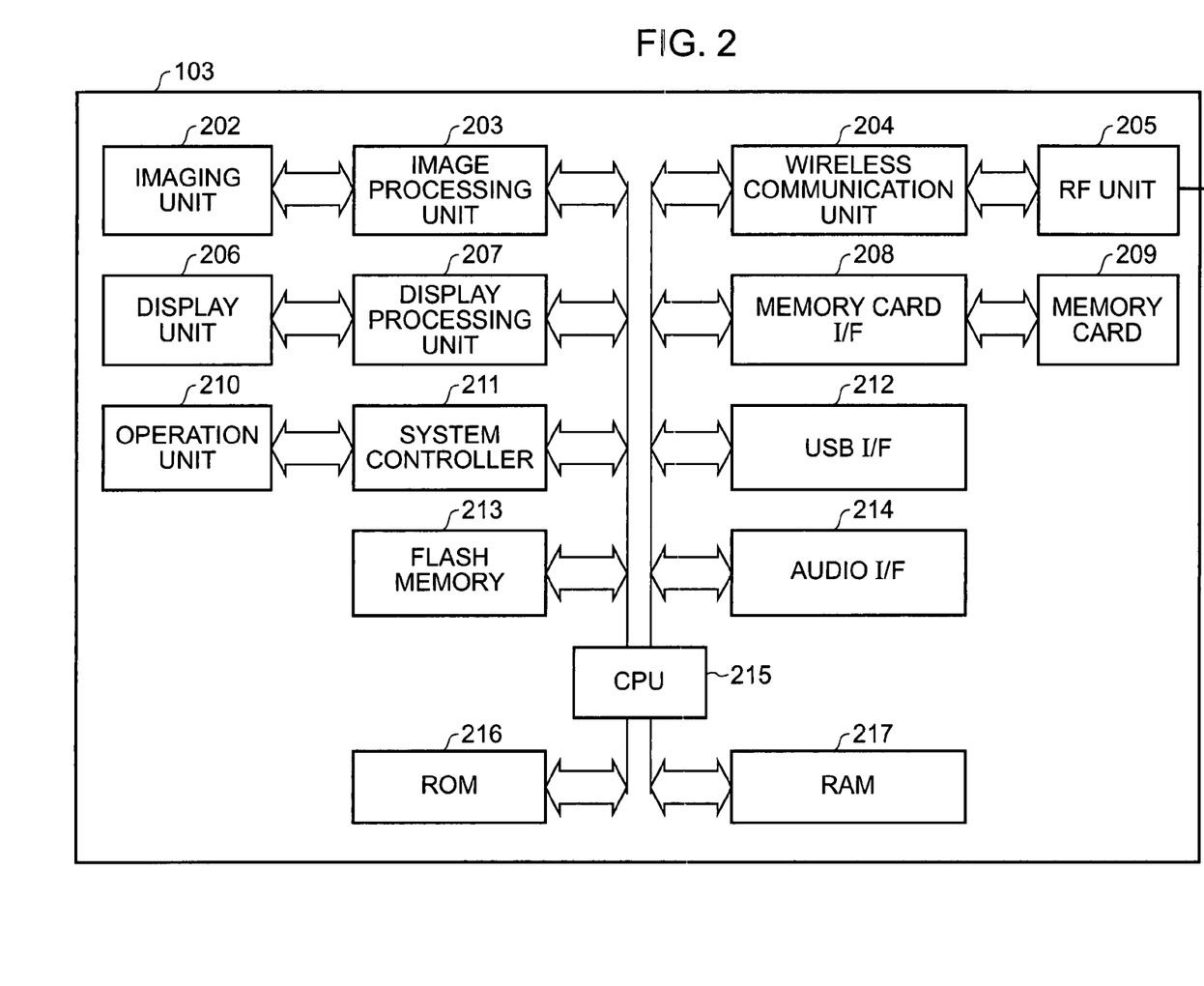
FIG. 2 is a block diagram showing the functional structure of a digital camera according to the exemplary embodiments.

FIG. 2 is a functional block diagram showing the functional structure of the digital camera 103 according to the exemplary embodiments. The structure of the digital camera 102 is similar to that of the digital camera 103. Thus, the description of the digital camera 102 is omitted.

An operation unit 210 of the digital camera 103 is connected to a central processing unit (CPU) 215 via a system controller 211. The operation unit 210 includes, for example, a shutter of the digital camera 103 and switches and buttons for establishing communication channels used in the exemplary embodiments. An imaging unit 202 is a functional block for capturing an image when the shutter is released, and is controlled by an image processing unit 203. A display unit 206 includes, for example, a liquid crystal display, a light-emitting diode (LED) display, and a voice output unit. The display unit 206 is a functional block for presenting various types of information to a user and is controlled by a display processing unit 207.

Still referring to FIG. 2, a wireless communication unit 204 is a functional block for performing wireless communication. A radio frequency (RF) unit 205 transmits and receives radio signals to and from other wireless communication devices. A memory card interface (I/F) 208 is an interface to which a memory card 209 is connected. A universal serial bus (USB) I/F 212 is an interface to which an external device is connected through a USB. An audio I/F 214 is an interface for transferring audio signals to an external device. The aforementioned functional blocks shown in FIG. 2 operate under the control of the CPU 215. A program executed by the CPU 215 is stored in a read only memory (ROM) 216 or a flash memory 213. Data to be processed by the CPU 215 is written to and read from a random access memory (RAM) 217 or the flash memory 213. The digital camera 103 stores the plurality of sets of parameters for infrastructure wireless communication and the plurality of sets of parameters for ad hoc wireless communication in the flash memory 213.

Figure 3:
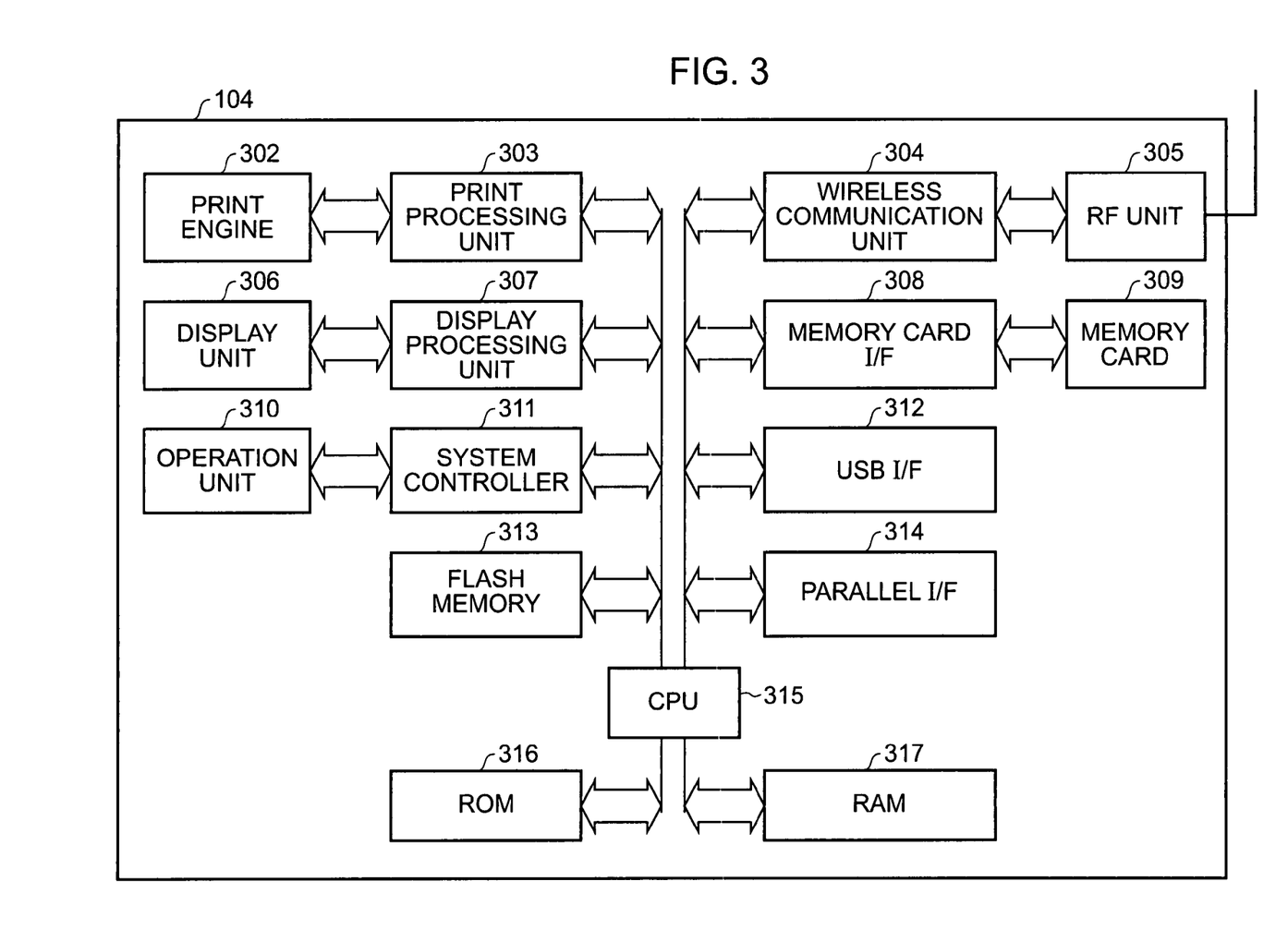
FIG. 3 is a block diagram showing the functional structure of a printer according to the exemplary embodiments.

FIG. 3 is a functional block diagram showing the functional structure of the printer 104 according to the exemplary embodiments. An operation unit 310 is connected to a CPU 315 via a system controller 311. The operation unit 310 includes, for example, switches and buttons for establishing communication channels used in the exemplary embodiments. A print engine 302 is a functional block for printing an image on a recording sheet and is controlled by a print processing unit 303. A display unit 306 includes, for example, a liquid crystal display, an LED display, and a voice output unit. The display unit 306 is a functional block for presenting information to a user and is controlled by a display processing unit 307.

Still referring to FIG. 3, a wireless communication unit 304 is a functional block for performing wireless communication. An RF unit 305 transmits and receives radio signals to and from other wireless communication devices. A memory card I/F 308 is an interface to which a memory card 309 is connected. A USB I/F 312 is an interface to which an external device is connected through a USB. A parallel I/F 314 is an interface to which an external device is connected by parallel communication. These functional blocks shown in FIG. 3 operate under the control of the CPU 315. A program controlled by the CPU 315 is stored in a ROM 316 or a flash memory 313. Data to be processed by the CPU 315 is written to and read from a RAM 317 or the flash memory 313.

Figure 4:
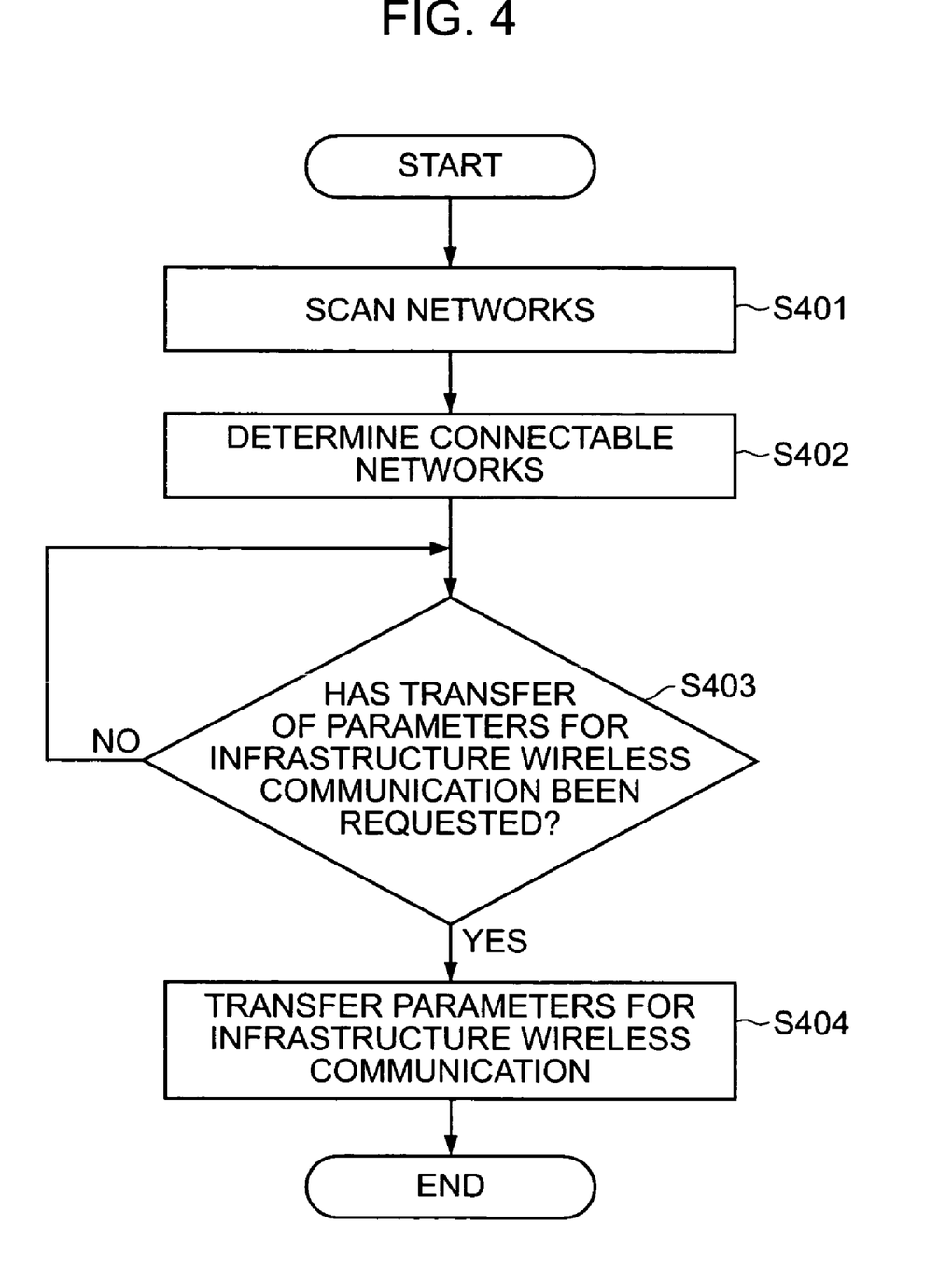
FIG. 4 is a flowchart showing the control process of one digital camera according to a first exemplary embodiment.

FIG. 4 is a flowchart showing the control process of the digital camera 103 according to the first exemplary embodiment. The program, which executes this process, is stored in the ROM 216 or the flash memory 213 and executed under the control of the CPU 215. The digital camera 103 stores the plurality of sets of parameters for infrastructure wireless communication and the plurality of sets of parameters for ad hoc wireless communication, as described above.

Referring to FIG. 4, first, in step S401, surrounding networks are scanned. Then, in step S402, networks that are detected are each regarded as a connectable infrastructure wireless communication network and a connectable ad hoc wireless communication network, and the detected networks are registered in the RAM 217. In this embodiment, a network formed by the AP 101 is registered as an infrastructure wireless communication network. Moreover, a network in which the digital camera 102 participates and a network in which the printer 104 participates are each registered as an ad hoc wireless communication network. Then, in step 403, it is determined whether transfer of parameters for infrastructure wireless communication has been requested by the digital camera 102. When it is determined that transfer of parameters for infrastructure wireless communication has been requested by the digital camera 102, the process proceeds to step S404. In step S404, wireless communication parameters of one of the networks, which are registered as connectable infrastructure wireless communication networks in step S402, are transferred to the digital camera 102 as connectable parameters for infrastructure wireless communication in the ad hoc mode. The parameters to be transferred in this step are those that are most suitable for the current environment, for example, parameters for infrastructure wireless communication for connecting to an infrastructure network in which the AP 101 having the strongest field intensity exists.

Figure 5:
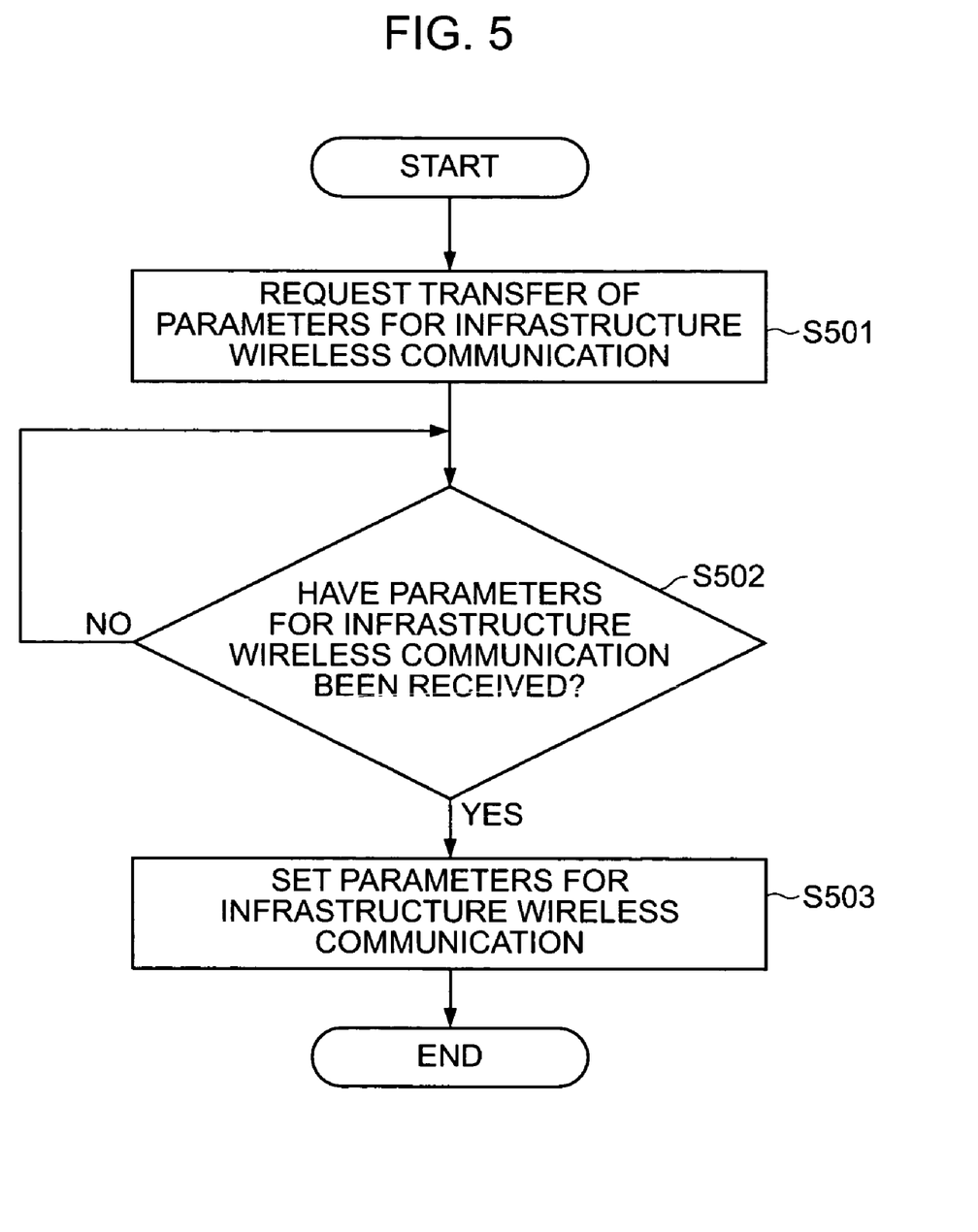
FIG. 5 is a flowchart showing the control process of the other digital camera according to the first exemplary embodiment.

FIG. 5 is a flowchart showing the control process of the digital camera 102 according to the first exemplary embodiment. The program, which executes this process, is stored in the ROM 216 or the flash memory 213 and executed under the control of the CPU 215.

Referring to FIG. 5, first, in step S501, the digital camera 102 requests the digital camera 103 to transfer parameters for infrastructure wireless communication to the digital camera 102. The digital camera 103 recognizes this request in step S403 in FIG. 4 and transfers connectable parameters for infrastructure wireless communication to the digital camera 102 in response to the request in step S404. Then, in step S502, it is determined whether the digital camera 102 has received parameters for infrastructure wireless communication from the digital camera 103. When it is determined that the digital camera 102 has received parameters for infrastructure wireless communication from the digital camera 103, the process proceeds to step S503. In step S503, the received parameters for infrastructure wireless communication are stored in the flash memory 213 and set as communication parameters.

In this embodiment, the digital camera 103 determines parameters for wireless communication that are most suitable for the current environment and transfers the determined parameters to the digital camera 102. Alternatively, the digital camera 103 may transfer all sets of connectable parameters for wireless communication in the current environment to the digital camera 102, and the digital camera 102 may determine the most suitable parameters for wireless communication.

In the first exemplary embodiment, the digital camera 102, which is newly added, can obtain communication parameters of wireless communication networks that are already configured to set the obtained parameters in itself, as described above.

Second Exemplary Embodiment

A second exemplary embodiment according to the present invention will now be described with reference to the drawings. In the second exemplary embodiment, a case will be described, where retransfer of parameters for infrastructure wireless communication is requested because parameters for infrastructure wireless communication that were transferred from the digital camera 103 are invalid in the digital camera 102. It is noted that the configuration of the wireless communication system and individual devices in the second exemplary embodiment are similar to those in the first exemplary embodiment and are not described here.

Figure 6:
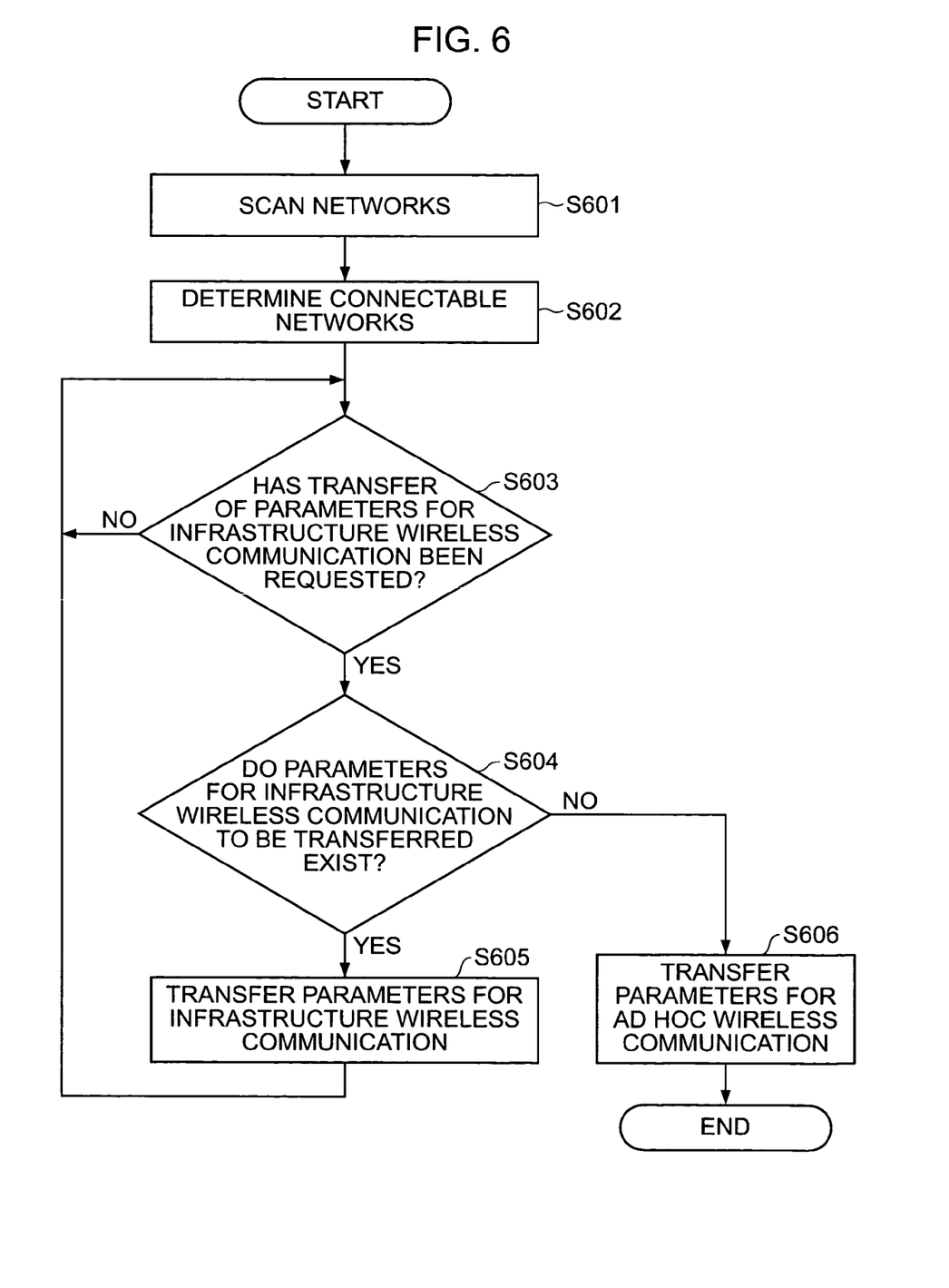
FIG. 6 is a flowchart showing the control process of one digital camera according to a second exemplary embodiment.

FIG. 6 is a flowchart showing the control process of the digital camera 103 according to the second exemplary embodiment. The program, which executes this process, is stored in the ROM 216 or the flash memory 213 and executed under the control of the CPU 215. The digital camera 103 stores a plurality of sets of parameters for infrastructure wireless communication and a plurality of sets of parameters for ad hoc wireless communication in the flash memory 213. Steps S601 to S603 and S605 in FIG. 6 are the same as steps S401 to S404 in FIG. 4.

Referring to FIG. 6, first, in step S601, surrounding networks are scanned. Then, in step S602, networks that are detected are each regarded as a connectable infrastructure wireless communication network and a connectable ad hoc wireless communication network, and the detected networks are registered in the RAM 217. Then, in step 603, it is determined whether transfer of parameters for infrastructure wireless communication has been requested by the digital camera 102. When it is determined that transfer of parameters for infrastructure wireless communication has been requested by the digital camera 102, the process proceeds to step S604. In step S604, it is determined whether parameters for infrastructure wireless communication that should be transferred to the digital camera 102 exist. When it is determined that such parameters exist, the process proceeds to step S605. In step S605, parameters for infrastructure wireless communication are transferred to the digital camera 102, and the process goes back to step S603.

When a set of parameters for infrastructure wireless communication to be transferred is determined, other sets of parameters for infrastructure wireless communication (for example, parameters for wireless communication of the AP 101) that have been already transferred to the digital camera 102 are first excluded. Then, another AP having a field intensity that is stronger than a predetermined value is determined. Then, parameters for infrastructure wireless communication used by this AP are transferred to the digital camera 102.

When it is determined in step S604 that parameters for infrastructure wireless communication that should be transferred do not exist, the process proceeds to step S606. In step S606, connectable parameters for ad hoc wireless communication are transferred to the digital camera 102, and the process is completed.

Figure 7:
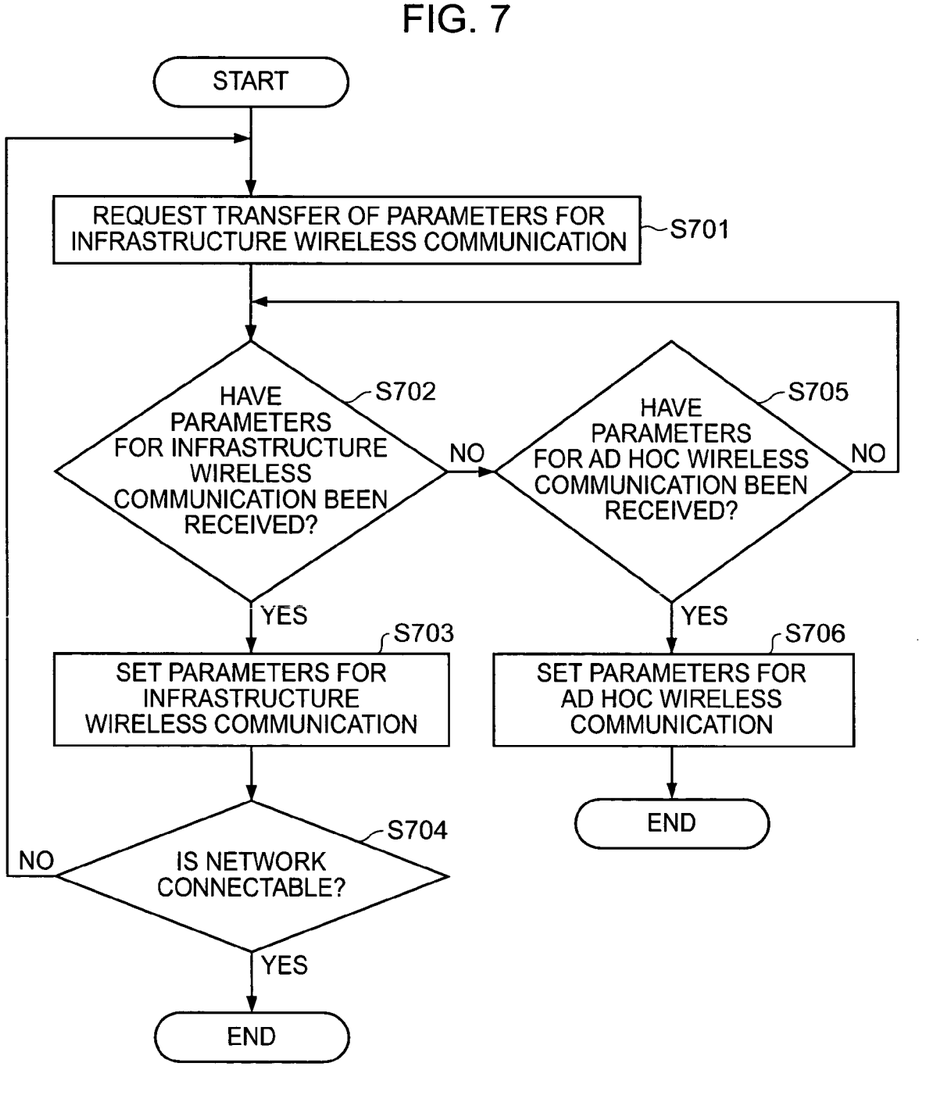
FIG. 7 is a flowchart showing the control process of the other digital camera according to the second exemplary embodiment.

FIG. 7 is a flowchart showing the control process of the digital camera 102 according to the second exemplary embodiment. The program, which executes this process, is stored in the ROM 216 or the flash memory 213 and executed under the control of the CPU 215.

Referring to FIG. 7, it is noted that steps S701 to S703 in FIG. 7 are similar to steps S501 to S503 in FIG. 5. First, in step S701, the digital camera 102 requests the digital camera 103 to transfer parameters for infrastructure wireless communication to the digital camera 102. Then, in step S702, it is determined whether the digital camera 102 has received parameters for infrastructure wireless communication from the digital camera 103. When it is determined that the digital camera 102 has received parameters for infrastructure wireless communication from the digital camera 103, the process proceeds to step S703. In step S703, the transferred parameters for infrastructure wireless communication are set in the digital camera 102. Then, in step S704, it is determined whether the digital camera 102 can connect to a wireless network that includes the digital camera 103 with the transferred parameters for infrastructure wireless communication. When it is determined that the digital camera 102 can connect to the wireless network, the process is completed. In contrast, when it is determined that the digital camera 102 cannot connect to the wireless network, the process goes back to step S701 where the digital camera 102 requests the digital camera 103 to again transfer parameters for infrastructure wireless communication to the digital camera 102.

When it is determined in step S702 that the digital camera 102 has not received parameters for infrastructure wireless communication from the digital camera 103, the process proceeds to step S705. In step S705, it is determined whether the digital camera 102 has received parameters for ad hoc wireless communication from the digital camera 103. When it is determined that the digital camera 102 has received parameters for ad hoc wireless communication, the process proceeds to step S706. In step S706, the transferred parameters for ad hoc wireless communication are set in the digital camera 102, and the process is completed.

In the second exemplary embodiment, the digital camera 102, which is newly added, can obtain communication parameters of wireless communication networks that are already configured to set the obtained parameters in itself, as described above. Moreover, when the digital camera 102 cannot connect to a network with the received parameters for wireless communication, retransfer of the parameters can be requested. Moreover, parameters for ad hoc wireless communication in addition to parameters for infrastructure wireless communication can be received and set in the digital camera 102.

Third Exemplary Embodiment

A third exemplary embodiment according to the present invention will now be described with reference to the drawings. In the third exemplary embodiment, the digital camera 102 requests the digital camera 103 to transfer parameters for wireless communication of a wireless network to which the digital camera 102 needs to connect, and the digital camera 103 transfers the requested parameters for wireless communication of the wireless network to the digital camera 102. The configuration of the wireless communication system and individual devices in the third exemplary embodiment are similar to those in the first exemplary embodiment and are not described here.

Figure 8:
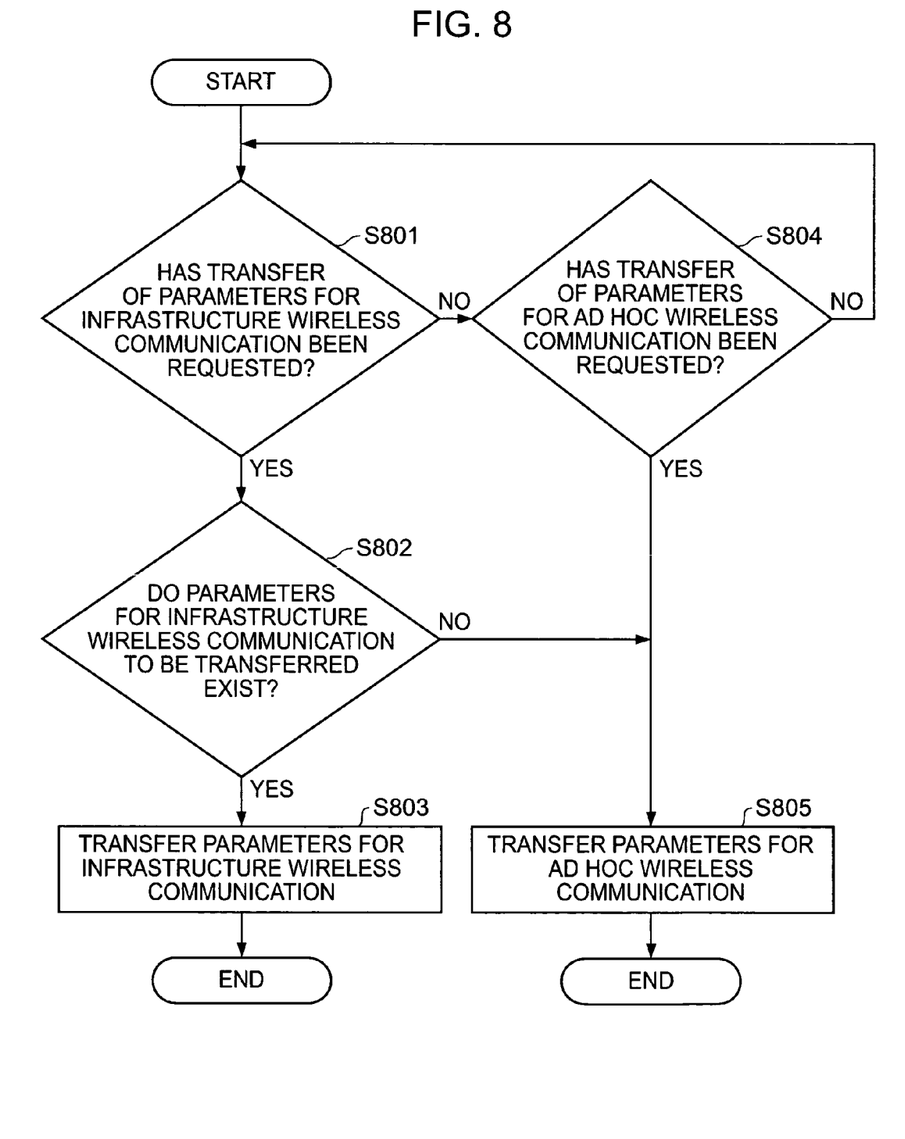
FIG. 8 is a flowchart showing the control process of one digital camera according to a third exemplary embodiment.

FIG. 8 is a flowchart showing the control process of the digital camera 103 according to the third exemplary embodiment. The program, which executes this process, is stored in the ROM 216 or the flash memory 213 and executed under the control of the CPU 215. The digital camera 103 stores a plurality of sets of parameters for infrastructure wireless communication and a plurality of sets of parameters for ad hoc wireless communication in the flash memory 213.

Referring to FIG. 8, first, in step S801, it is determined whether transfer of parameters for infrastructure wireless communication has been requested by the digital camera 102. When the digital camera 103 receives the request, the process proceeds to step S802. In step S802, it is determined whether the requested parameters for wireless communication of an infrastructure network are stored. When it is determined that the requested parameters exist, the process proceeds to step S803. In step S803, the corresponding parameters for infrastructure wireless communication are transferred to the digital camera 102, and the process is completed.

On the other hand, when it is determined in step S802 that the requested parameters do not exist, the process proceeds to step S805. In step S805, parameters for ad hoc wireless communication are transferred to the digital camera 102, and the process is completed.

When it is determined in step S801 that transfer of parameters for infrastructure wireless communication has not been requested by the digital camera 102, the process proceeds to step S804. In step S804, it is determined whether transfer of parameters for ad hoc wireless communication has been requested by the digital camera 102. When it is determined that transfer of parameters for ad hoc wireless communication has been requested, the process proceeds to step S805 where parameters for ad hoc wireless communication are transferred to the digital camera 102.

Figure 9:
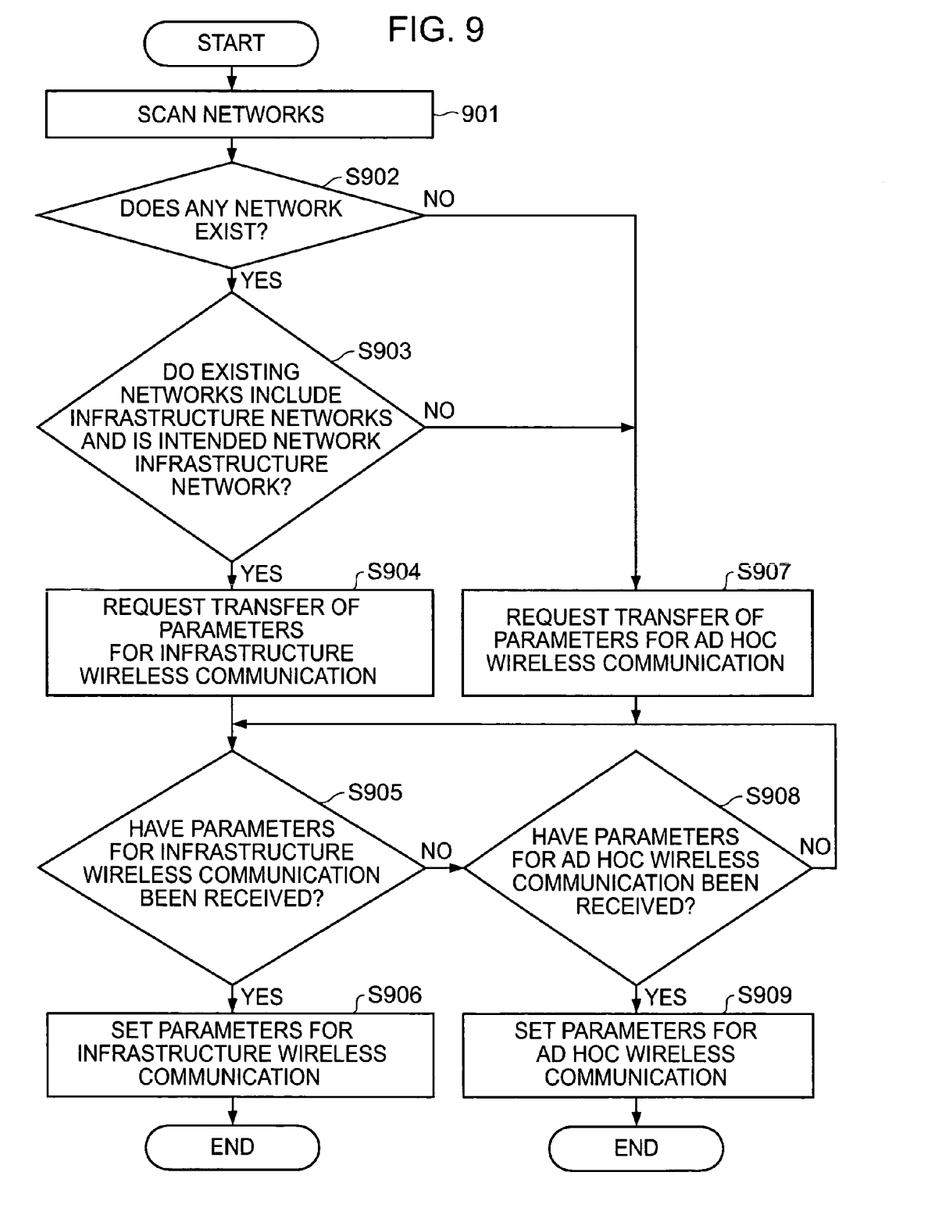
FIG. 9 is a flowchart showing the control process of the other digital camera according to the third exemplary embodiment.

FIG. 9 is a flowchart showing the control process of the digital camera 102 according to the third exemplary embodiment. The program, which executes this process, is stored in the ROM 216 or the flash memory 213 and executed under the control of the CPU 215.

Referring to FIG. 9, first, in step S901, the digital camera 102 scans surrounding wireless networks. Then, in step S902, it is determined whether any wireless network exists within communication range. When it is determined that wireless networks exist within communication range, the process proceeds to step S903. In step S903, it is determined whether the existing wireless networks include infrastructure wireless networks and a network to which the digital camera 102 needs to connect is an infrastructure wireless network. When it is determined that the existing wireless networks include infrastructure wireless networks and the network to which the digital camera 102 needs to connect is an infrastructure wireless network, the process proceeds to step S904. In step S904, the digital camera 102 requests the digital camera 103 to transfer to the digital camera 102 parameters for infrastructure wireless communication that include the name of the infrastructure wireless network, to which the digital camera 102 needs to connect, in the existing infrastructure wireless networks.

When it is determined in step S903 that the existing wireless networks do not include infrastructure wireless networks or the network to which the digital camera 102 needs to connect is an ad hoc wireless network, the process proceeds to step S907. In step S907, the digital camera 102 requests the digital camera 103 to transfer to the digital camera 102 parameters for ad hoc wireless communication that include the name of an ad hoc wireless network to which the digital camera 102 needs to connect.

The process proceeds to step S905 after step S904 or S907. In step S905, it is determined whether the digital camera 102 has received parameters for infrastructure wireless communication from the digital camera 103. When it is determined that the digital camera 102 has received parameters for infrastructure wireless communication from the digital camera 103, the process proceeds to step S906. In step S906, the digital camera 102 sets the received parameters for infrastructure wireless communication in itself and connects to the corresponding infrastructure wireless network.

When it is determined in step S905 that the digital camera 102 has not received parameters for infrastructure wireless communication from the digital camera 103, the process proceeds to step S908. In step S908, it is determined whether the digital camera 102 has received parameters for ad hoc wireless communication from the digital camera 103. When it is determined that the digital camera 102 has received parameters for ad hoc wireless communication from the digital camera 103, the process proceeds to step S909. In step S909, the digital camera 102 sets the received parameters for ad hoc wireless communication in itself and connects to the corresponding ad hoc wireless network.

When it is determined in step S902 that any wireless network does not exist within communication range, the process proceeds to step S907. In step S907, the digital camera 102 requests the digital camera 103 to transfer to the digital camera 102 parameters for ad hoc wireless communication that include the name of an ad hoc wireless network to which the digital camera 102 needs to connect.

In the third exemplary embodiment, the digital camera 102 determines a wireless network to which the digital camera 102 needs to connect and requests the digital camera 103 to transfer the corresponding parameters for wireless communication to the digital camera 102. Alternatively, the digital camera 102 may transfer all of the results (the names, and field intensities or connection priorities based on, for example, field intensities of individual networks) of scanning networks obtained by the digital camera 102 to the digital camera 103. In this case, the digital camera 103 may determine whether the digital camera 103 stores parameters for wireless communication corresponding to a network that has the highest priority. When the digital camera 103 determines that the digital camera 103 stores the corresponding parameters for wireless communication, the digital camera 103 may transfer the parameters for wireless communication to the digital camera 102.

Alternative Exemplary Embodiments

Although transfer of parameters for wireless communication between digital cameras was described in the aforementioned exemplary embodiments, the present invention is also applicable to transfer of parameters for wireless communication between different wireless communication devices, for example, between a digital camera and a printer. The aforementioned parameters for wireless communication include information, for example, a service set identifier (SSID) that serves as a network identifier, a frequency channel, a encryption method (encryption type), a encryption key, an authentication method (authentication type), and an authentication key in a wireless local area network (LAN) based on IEEE 802.11. Moreover, although a wireless LAN based on IEEE 802.11 was described in the aforementioned exemplary embodiments, communication parameters of other wireless communication systems, for example, WiMedia, Wireless USB, and Wireless 1394, may be transferred between devices. The present invention is also applicable to a wire communication system.

The exemplary embodiments can be implemented by providing to a system or a device, directly or from a remote site, a software program that performs the functions according to the aforementioned exemplary embodiments and by causing a computer included in the system or in the device to read out and execute program codes of the provided software program. Thus, the exemplary embodiments can be implemented by the program codes, which are installed in the computer to perform the functions according to the exemplary embodiments by the computer. That is to say, the exemplary embodiments can include a computer program that performs the functions according to the exemplary embodiments. In the case of the program, the exemplary embodiments can be embodied in various forms, for example, object codes, a program executed by an interpreter, script data provided for an operating system (OS), so long as they have the program functions described above.

A typical storage medium for providing the program is a floppy disk, a hard disk, an optical disk, a magneto-optical (MO) disk, a compact disk-read only memory (CD-ROM), a CD-recordable (CD-R), a CD-rewritable (CD-RW), a magnetic tape, a nonvolatile memory card, a ROM, or a digital versatile disk (DVD) (a DVD-ROM or a DVD-R). Moreover, in a method for distributing the program, users can access a home page on the Internet (e.g., by using a browser on a client computer) and then download the computer program according to the exemplary embodiment as is or a file that is generated by compressing the computer program and that has an automatic installation function from the home page to a storage medium, for example, a hard disk. Moreover, in another method for distributing the program, the program codes constituting the program according to the exemplary embodiments can be divided into a plurality of files, and then these files can be downloaded from different home pages. That is to say, an Internet server that allows a plurality of users to download the program files for performing the functions according to the exemplary embodiments on a computer is also included in the scope of the present invention.

Moreover, the program according to the exemplary embodiments can be encoded and stored in a storage medium, for example, a CD-ROM, and distributed to users. Then, users who satisfy predetermined conditions can download key information for decoding from a home page through the Internet, and the encoded program can be decoded using the key information and installed in a computer to implement the exemplary embodiments.

Furthermore, an OS operating on a computer can execute some or all of the actual processing to perform the functions of the aforementioned exemplary embodiments according to instructions from the program.

Moreover, the program read out from a recording medium can be written to a memory included in, for example, a function expansion board inserted in a computer or a function expansion unit connected to a computer. Then, for example, a CPU included in the function expansion board or the function expansion unit may execute some or all of the actual processing to perform the functions of the aforementioned exemplary embodiments according to instructions from the program.

As of the result of the aforementioned features of the present invention, available communication parameters can be readily set in a communication device that is added to a network, as described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-130477 filed Apr. 27, 2005, which is hereby incorporated by reference herein in its entirety.

What is claimed is:

1. A communication device having wireless capabilities configured to communicate in a first communication mode via an access point and in a second communication mode directly with another communication device without utilizing an access point, the communication device comprising:
   a storage unit configured to store communication parameters to connect to each of a plurality of wireless networks;
   a scanning unit configured to scan a wireless network in a surrounding area;
   a determining unit configured to determine communication parameters to connect to the wireless network detected in the scanning process by the scanning unit from among the plurality of communication parameters stored in the storage unit;
   a receiving unit configured to receive a request from another communication device for transferring communication parameters in the second communication mode; and
   a transmitting unit configured to transmit communication parameters determined by the determination unit to the another communication device in response to the request received by the receiving unit,
   wherein the storage unit is configured to store individual communication parameters to connect to wireless networks of the first and second communication modes, and
   wherein the transmitting unit is configured to transmit the communication parameters to connect to a wireless network in a communication mode specified by the another communication device from among parameters stored in the storage unit.

2. The communication device according to claim 1, wherein the transmitting unit is configured to transmit communication parameters to connect to a wireless network in another communication mode when the communication parameters to connect to a wireless network in the communication mode specified by the another communication device.

3. A communication device having wireless capabilities configured to communicate with other communication devices in a plurality of differing modes, the communication device comprising:
   a storage unit configured to store communication parameters to connect to each of a plurality of wireless networks;
   a scanning unit configured to scan a wireless network in a surrounding area;
   a determining unit configured to determine communication parameters to connect to the wireless network detected in the scanning process by the scanning unit from among the plurality of communication parameters stored in the storage unit;
   a receiving unit configured to receive a request from another communication device for transferring communication parameters in one of the plurality of modes; and
   a transmitting unit configured to transmit communication parameters determined by the determination unit to the another communication device in response to the request received by the receiving unit,
   wherein the storage unit is configured to store individual communication parameters to connect to wireless networks of the first and second communication modes, and
   wherein the transmitting unit is configured to transmit the communication parameters to connect to a wireless network in a communication mode specified by the another communication device from among parameters stored in the storage unit.

4. A method for setting communication parameters of a communication device having wireless capabilities that is configured to communicate in a first communication mode via an access point and in a second communication mode directly with another communication devices without utilizing an access point, the device including a storage unit configured to store individual communication parameters to connect to wireless networks of the first and second communication modes, the method comprising:
   scanning for a wireless network in a surrounding area;
   determining communication parameters to connect to the wireless network detected in the scanning process from among the plurality of communication parameters stored in the communication device;
   receiving a request from another communication device for transferring communication parameters in one of the plurality of communication modes; and
   transmitting the determined communication parameters to the another communication device in response to the request, wherein the transmitting includes transmitting the communication parameters to connect to the wireless network in a communication mode specified by the another communication device from among parameters stored in the storage unit.

5. A computer readable storage medium containing computer-executable instructions for causing a communication device to set communication parameters, the communication device configured to communicate in a first communication mode via an access point and in a second communication mode directly with another communication devices without utilizing an access point, the device including a storage unit configured to store individual communication parameters to connect to wireless networks of the first and second communication modes, the medium comprising:
   computer-executable instructions for scanning a wireless network in a surrounding area;
   computer-executable instructions for determining communication parameters to connect to the wireless network detected in the scanning from among the plurality of communication parameters stored in the communication device;
   computer-executable instructions for receiving a request from another communication device for transferring communication parameters, the request being received in the second communication mode; and
   computer-executable instructions for transmitting the determined communication parameters to the another communication device when it is determined that the request has been received, wherein the transmitting includes transmitting the communication parameters to connect to the wireless network in a communication mode specified by the another communication device from among parameters stored in the storage unit.

* * * * *